United States Patent Office.

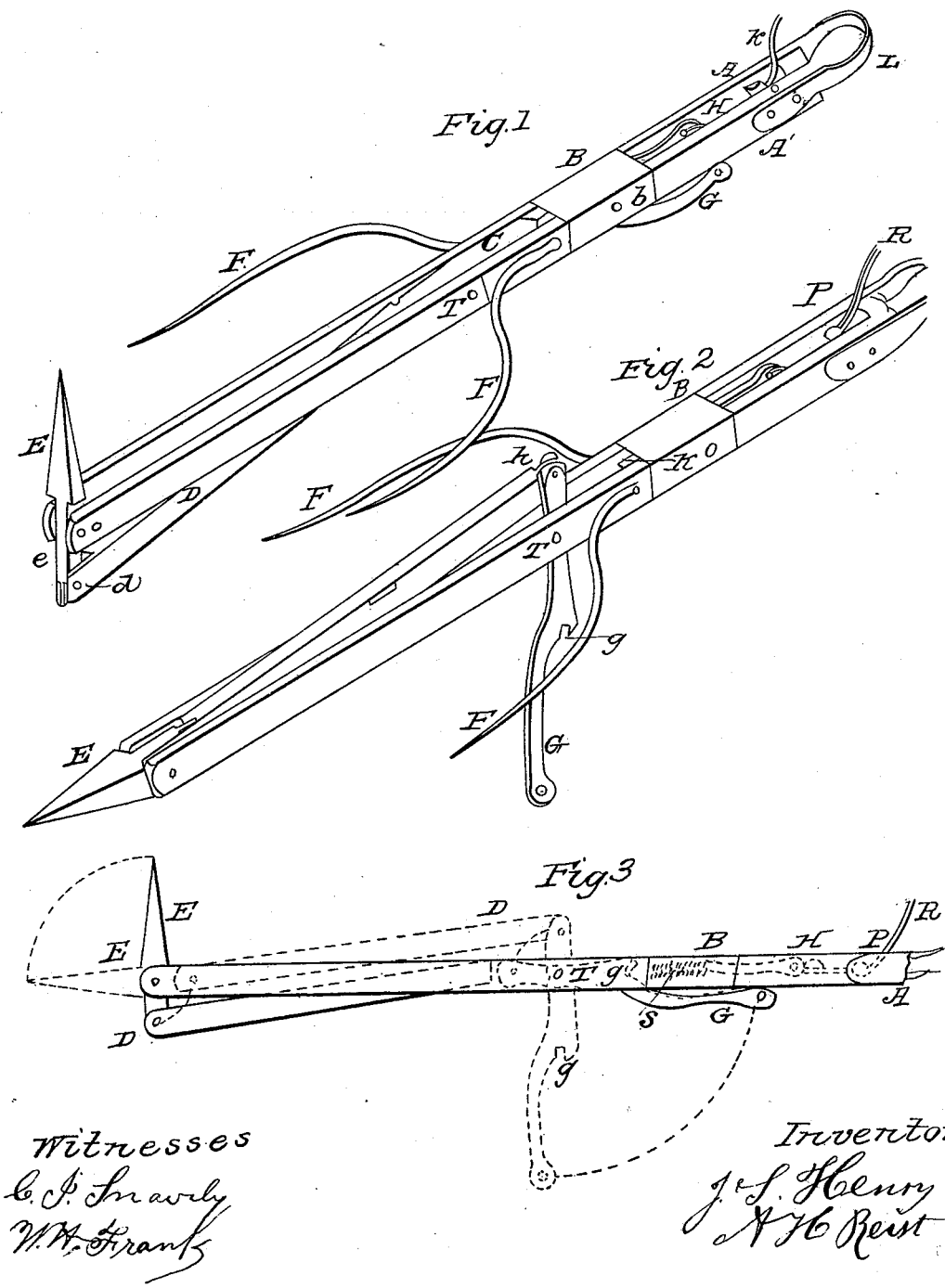

JOHN S. HENRY AND ABRAHAM H. REIST, OF MANHEIM, PENNSYLVANIA.

Letters Patent No. 68,195, dated August 27, 1867

IMPROVEMENT IN HORSE HAY-FORKS.

*The Schedule referred to in these Letters Patent and making part of the same.*

TO ALL WHOM IT MAY CONCERN:

Be it known that we, JOHN S. HENRY and ABRAHAM H. REIST, of Manheim, in the county of Lancaster, and State of Pennsylvania, have invented a new and useful Improvement on Horse-Forks for Elevating Hay; and we do hereby declare that the following is a full, clear, and exact description of the construction and operation of the same, reference being had to the accompanying drawings, making a part of this specification, in which—

Figure 1 is a perspective drawing of the elevator, with the point at right angles to the double shaft, with my improvement in place.

Figure 2, the same when the point is extended in a line with the shaft.

Figure 3 illustrates the change of position from fig. 1 to fig. 2 by the dotted lines.

The nature of our invention consists in the arrangement of the parts to give efficiency to machines of this class for elevating hay, so to locate the pivoted point and operate it by a lock or spring-catch in a manner to prevent it from releasing its load until the lever is actually unlocked by the action of the cord in the hands of the operator. This, I am aware, is performed on some of the numerous inventions already patented, differing, however, in other respects substantially in their arrangement.

To enable others skilled in the art to make and use our invention, we will proceed to describe its construction and operation, clearly shown by the drawings.

We employ a pair of parallel bars, A A', of stout strap iron of sufficient length and strength. The upper end is continued into a loop, b, for the hoisting rope, or a piece expressly made and bolted on the ends of the bars A A', where they are joined by interposing a cross-plug or piece, so that the bars are separated at an equal distance apart their entire length. A spiral spring surrounds a rod terminated with an eye, H, projecting at one end, and a catch, K, at the lower end from spring-box B. This catch K locks into a notch, g, on the lever C, which latter has an eye at one end for a rope connection, and the other end is connected by a pivot to a bar, D, operating between the bars A A'. Said lever is held by a pivot between the bars at T. The jointed bar D or lever is connected by a pivot at its lower end, at d, with the terminal point E held by its inner end at a, between the parallel bars upon which it moves as a fulcrum. The position of this point E and lever-bar D is shown when the lever-bar G is locked by the spring-bolt K H, by fig. 1. When in this position it is being elevated with a load of hay held by the side tines F and point E, to cause it to discharge its load it is only necessary to draw upon the cord R passing over a pulley, P, to the eye of the spring-bolt H, which draws the bolt K out of the notch g, so that the weight resting on the point E will now cause it to straighten out, and thereby discharge the hay when the parts assume the position shown by fig. 2, ready for plunging into the hay again for a fresh load. By pushing the arm G up against the bars A, the spring-bolt mechanically locks the part as the lower point E is again thrown out at right angles to the bars. The operation is shown by fig. 3, already referred to.

We are aware that the side tines F and action of the point E are not new, and indeed all, separately considered, are again and again used in the various combinations in a manner to produce similar results, but differing substantially in their arrangement. The points in use do not stand square with the ends of parallel bars, and moved by an internal combined lever with another lever having a lock-notch for the action of a spring-bolt, thus constituting a valuable improvement by this arrangement, which results in making it efficient and reliable for the purpose intended, and obviating the defects and objections to elevators of this class heretofore introduced.

We do not claim the pivoted point, side prongs, spring-bolt, catch, &c., separately considered, for such are in use under various combinations, the special arrangements of which are claimed in divers manners, each differing, as ours differs from all of them.

What we claim as our invention, and desire to secure by Letters Patent, is—

The arrangement of the notched lever G, in combination with the spring-bolt K H for operating the point E by a connecting-lever, D, between the parallel bars A A', all combined and operating in the manner and for the purpose specified.

J. S. HENRY,
A. H. REIST.

Witnesses:
C. J. SNAVELY,
W. H. FRANK.